US008738801B2

(12) United States Patent
Swaminathan et al.

(10) Patent No.: US 8,738,801 B2
(45) Date of Patent: May 27, 2014

(54) METHODS AND APPARATUS FOR UPDATING INDEX INFORMATION WHILE ADDING AND UPDATING DOCUMENTS IN A DISTRIBUTED NETWORK

(75) Inventors: Ashwin Swaminathan, San Diego, CA (US); Vidya Narayanan, San Diego, CA (US); Ranjith Subramanian Jayaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 12/835,650

(22) Filed: Jul. 13, 2010

(65) Prior Publication Data

US 2011/0016226 A1 Jan. 20, 2011

Related U.S. Application Data

(60) Provisional application No. 61/225,396, filed on Jul. 14, 2009.

(51) Int. Cl.
*G06F 15/173* (2006.01)

(52) U.S. Cl.
USPC ............................ 709/238; 709/205; 370/396

(58) Field of Classification Search
USPC ................................................. 709/238, 242
See application file for complete search history.

(56) References Cited

U.S. PATENT DOCUMENTS

| 7,328,243 | B2 * | 2/2008 | Yeager et al. | 709/205 |
|---|---|---|---|---|
| 2003/0220925 | A1 | 11/2003 | Lior | |
| 2005/0080768 | A1 | 4/2005 | Zhang et al. | |
| 2007/0061487 | A1 | 3/2007 | Moore et al. | |
| 2007/0195796 | A1 * | 8/2007 | Ushiyama et al. | 370/396 |
| 2008/0104034 | A1 | 5/2008 | Stewart et al. | |
| 2008/0168135 | A1 | 7/2008 | Redlich et al. | |
| 2009/0019106 | A1 | 1/2009 | Loupia | |
| 2009/0164437 | A1 * | 6/2009 | Torbjornsen | 707/3 |

FOREIGN PATENT DOCUMENTS

TW          200817944 A      4/2008

OTHER PUBLICATIONS

Banaei-Kashani F. et al., "WSPDS: Web Services Peer-to-peer Discovery Service", In Proceedings of International Conference on Internet Computing, 2004. pp. 1-7.
International Search Report and Written Opinion—PCT/US2010/042019, International Search Authority—European Patent Office—Mar. 15, 2011.
Wang H. et al.,"An Efficient and Secure Peer-to-Peer Overlay Network", Proceedings of the IEEE Conference on Local Computer Networks 30th Anniversary (LCN'05), 2005, pp. 1-8.
Taiwan Search Report—TW099123169—TIPO—Jul. 15, 2013.

* cited by examiner

*Primary Examiner* — Liangche A Wang
*Assistant Examiner* — Cheikh Ndiaye
(74) *Attorney, Agent, or Firm* — Kristine U. Ekwueme

(57) ABSTRACT

Systems and methods are described herein for updating documents in a distributed network. When a new document needs to be added to the network, or when changes are to be made to an existing document, keywords are extracted from the document and used to generate update messages for each keyword. The nodes responsible for each keyword are determined. The individual update messages are consolidated into a composite update messages that is sent to a first node in the network. The first node extracts those portions of the composite message associated with it, and forwards the composite message to a second node in the network.

23 Claims, 5 Drawing Sheets

METHODS AND APPARATUS FOR UPDATING INDEX INFORMATION WHILE ADDING AND UPDATING DOCUMENTS IN A DISTRIBUTED NETWORK

CLAIM OF PRIORITY UNDER 35 U.S.C. §119

The present Application for Patent claims priority to Provisional Application No. 61/225,396 entitled "Method and Apparatus for Updating Index Information While Adding or Updating Documents in a Distributed Network" filed Jul. 14, 2009, assigned to the assignee hereof and hereby expressly incorporated by reference herein.

BACKGROUND

1. Field

The present disclosure relates to adding or updating information in a distributed network, and more particularly to an apparatus and method of adding or updating information in a structured overlay network.

2. Background

In distributed networks, different network resources, such as data, processors, etc., are located at and distributed across various computing devices in the network. The computing devices interact with each other to perform various tasks. An overlay network, one type of distributed network, is a virtual network of nodes and logical links that is built on top of an existing network. Examples of an overlay network include, but are not limited to, the Internet, Chord, Content Addressable Network (CAN), Pastry, and Viceroy. In some overlay networks, each node can store a portion of overlay network data, called a partition, so as to distribute the data across the network to increase network efficiency in storage and retrieval of the data.

A device or node that joins an overlay network may desire to obtain a service from another device or node in the overlay network. Such services are published in the overlay network using any one of a plurality of service description languages, each having a corresponding service discovery protocol for use to find the published service. A definition of service discovery as given by Wikipedia states: "[s]ervice discovery protocols are network protocols which allow automatic detection of devices and services offered by these devices on a computer network." In other words, service discovery is the action of finding a service provider for a requested service. When the location of the demanded service (typically the address of the service provider) is retrieved, the user may further access and use it.

In general, service discovery protocols include two entities: (a) the service provider—who provides the service on the overlay, and (b) the client—who uses the service. In one aspect, examples of a service provider include nodes which provide services such as printing, scanning, faxing, storage, music share, file share, games, and web services such as for booking movie tickets, hotels, air tickets, or online gaming, etc. Further, any node in the network can act as a client. Thus, the goal of service discovery is to help the client find a service provider for a particular service of interest (if such a service exists).

In the prior art, a problem exists in adding or updating information to the overlay. In the prior art, a new document requires one PUT command for the document and one each for every keyword present in the document. If the document has K keywords, then K PUT commands need to be separately issued and this would require $O(K \log N)$ messages, wherein N is the total number of nodes in the overlay. This process is expensive and results in a great amount of network overhead.

Thus, it would be desirable to have a method of adding or updating information to the overlay that is less costly and more efficient.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, a method of updating index information in a structured overlay network, comprises receiving, at a source node, a new or updated document for publishing in a structured overlay network; extracting a plurality of keywords from the document; generating an update message for each keyword defining a plurality of keyword update messages; identifying a plurality of nodes in the structured overlay network corresponding to each keyword; concatenating the plurality of keyword update messages into a composite keyword update message; and forwarding the first keyword update message to a first selected one of the plurality of nodes.

Yet another aspect relates to at least one processor configured to publish or discover services in a network, comprises a first module for receiving a new or updated document for publishing in a structured overlay network; a second module for extracting a plurality of keywords from the document; a third module for generating an update message for each keyword defining a plurality of keyword update messages; a fourth module for identifying a plurality of nodes in the structured overlay network corresponding to each keyword; a fifth module for concatenating the plurality of keyword update messages into a composite keyword update message; and a sixth module for forwarding the composite keyword update message to a first selected one of the plurality of nodes.

Still another aspect relates to a computer program product, comprising a computer-readable medium comprises a first set of codes for causing a computer to receive a new or updated document for publishing in a structured overlay network; a second set of codes for causing the computer to extract a plurality of keywords from the document; a third set of codes for causing the computer to generate an update message for each keyword defining a plurality of keyword update messages; a fourth set of codes for causing the computer to identify a plurality of nodes in the structured overlay network corresponding to each keyword; a fifth set of codes for causing the computer to concatenate the plurality of keyword update messages into a composite keyword update message; and a sixth set of codes for causing the computer to forward the composite keyword update message to a first selected one of the plurality of nodes.

Yet another aspect relates to an apparatus, comprises means for receiving a new or updated document for publishing in a structured overlay network; means for extracting a plurality of keywords from the document; means for generating an update message for each keyword defining a plurality of keyword update messages; means for identifying a plurality of nodes in the structured overlay network corresponding to each keyword; means for concatenating the plurality of keyword update messages into a composite keyword update message; and means for forwarding the first keyword update message to a first selected one of the plurality of nodes.

Another aspect relates to an apparatus for updating index information in a structured overlay network, comprises a receiver configured to receive a new or updated document for publishing in a structured overlay network; and a service description update component configured to extract a plurality of keywords from the document, generate an update message for each keyword defining a plurality of keyword update messages, identify a plurality of nodes in the structured overlay network corresponding to each keyword, concatenate the plurality of keyword update messages into a composite keyword update message, and forward the composite keyword update message to a first selected one of the plurality of nodes.

According to another aspect, an apparatus for processing service description update messages in a structured overlay network, comprises a receiver configured to receive a composite keyword update message, the composite keyword update message including a plurality of keyword update messages; and a service description update component configured to extract a first one of the plurality of keyword update messages from the composite keyword update message, perform updates according to the extracted keyword update message, and forward the composite keyword message to a second selected one of the plurality of nodes.

According to another aspect, a method for processing service description update messages in a distributed network comprises receiving a composite keyword update message, the composite keyword update message including a plurality of keyword update messages; extracting a first one of the plurality of keyword update messages from the composite keyword update message; updating one or more documents in accordance with the extracted keyword update message; and forwarding the composite keyword message to a selected one of a plurality of nodes in the distributed network.

In accordance with another aspect, at least one processor configured processing service description update messages in a distributed network, comprises a first module for receiving a composite keyword update message, the composite keyword update message including a plurality of keyword update messages; a second module for extracting a first one of the plurality of keyword update messages from the composite keyword update message; a third module for updating one or more documents in accordance with the extracted keyword update message; and a fourth module for forwarding the composite keyword message to a selected one of a plurality of nodes in the distributed network.

In another aspect, a computer program product, comprising a computer-readable medium comprises a first set of codes for causing a computer to receive a composite keyword update message, the composite keyword update message including a plurality of keyword update messages; a second set of codes for causing the computer to extract a first one of the plurality of keyword update messages from the composite keyword update message; a third set of codes for causing the computer to update one or more documents in accordance with the extracted keyword update message; and a fourth set of codes for causing the computer to forward the composite keyword message to a selected one of a plurality of nodes in the distributed network.

In yet another aspect, an apparatus comprises means for receiving a composite keyword update message, the composite keyword update message including a plurality of keyword update messages; means for extracting a first one of the plurality of keyword update messages from the composite keyword update message; means for updating one or more documents in accordance with the extracted keyword update message; and means for forwarding the composite keyword message to a selected one of a plurality of nodes in the distributed network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Networks, such as peer-to-peer networks rely on the ability to discover devices and services offered by those devices on a computer network. The systems and methods described herein are directed to efficiently updating index information on a distributed network such as an overlay network. Individual updated messages are concatenated and then sent serially to the respective nodes, which extract the update message (s) relevant to the node and forward the message to the next node until all update messages are delivered.

Figure 1:
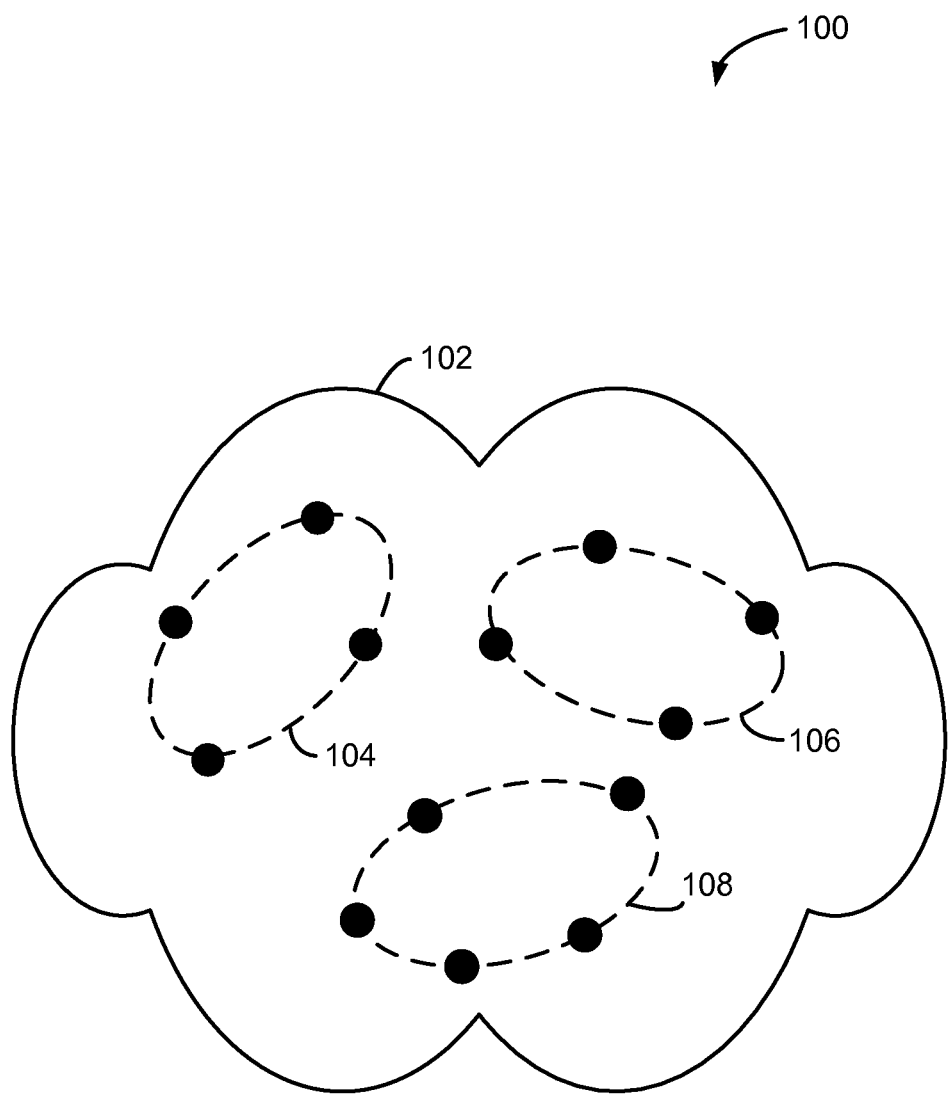
FIG. 1 is a block diagram of an aspect of a peer-to-peer network.

With reference to FIG. 1, a block diagram of a peer-to-peer overlay network 100 is provided. The network 100 comprises an underlying network 102 that comprises any type of network, such as an Internet Protocol network. Although the underlying network 102 is shown as a single entity, the underlying network may comprise any number or types of networks such as WANs, LANs, wireless networks, or any other type of network. While FIG. 1 depicts a peer-to-peer overlay network, the present application is not limited to overlay networks. The systems and methods described herein are equally applicable to any type of network, including a centralized network. For example, the network 100 may include a server that provides discovery services. In such a case, the server may act as a directory that hosts information relevant for discovery. For example, the server may host keywords and corresponding information that are published by the nodes in the network. The nodes may publish the information to the server, and queries may also be sent to the server.

In an aspect, the underlying network 102 comprises multiple peer-to-peer networks (104, 106, and 108). The peer-to-peer networks 104, 106, and 108 each comprise a subset of nodes of the underlying network 102, and operate utilizing the services of the underlying network 102 to allow those nodes to communicate. For example, in the peer-to-peer networks 104, 106, and 108, the nodes are connected by communication links provided by the underlying network 102 to form desired routing paths. The peer-to-peer networks 104, 106, and 106 may have any topology or architecture to enable any routing configuration, and are not limited to the configurations shown in FIG. 1.

Within a peer-to-peer overlay network, such as networks 104, 106, and 108, each node can operate as a service provider and/or as a client. That is, the node may provide services to the overlay, and may use services of one or more other nodes. Such services may include, for example, printing, scanning, faxing, storage, music share, file share, games, and web services such as booking movie tickets, hotels, air tickets, or online gaming. It is noted, however, that these examples of services are non-limiting, and the actual services may include more or less services than those listed. Each node may comprise a computing device such as, for example, a personal computer, a laptop computer, a wireless communications device, a mobile telephone, a personal digital assistant, a printer, a fax machine, and/or any other network-connectable computing device.

A service discovery protocol may be used to assist a node acting as a client in finding a service provider for a particular service of interest. A service provider specifies its services using a service description language such as, for example, eXtensible Markup Language (XML), Resource Description Format (RDF), RDF-S, Web Service Description Language (WSDL), WSDL-S, Ontology Web Language (OWL), Ontology Web Language for Services (OWL-S), Universal Description Discovery and Integration (UDDI), Universal Plug and Play (UPnP), and/or other service description languages. Metadata about the services is stored in a searchable format on the nodes in the overlay, and clients may express a service request using searchable keywords that are passed on to a querying system to help find the corresponding services.

Figure 2:
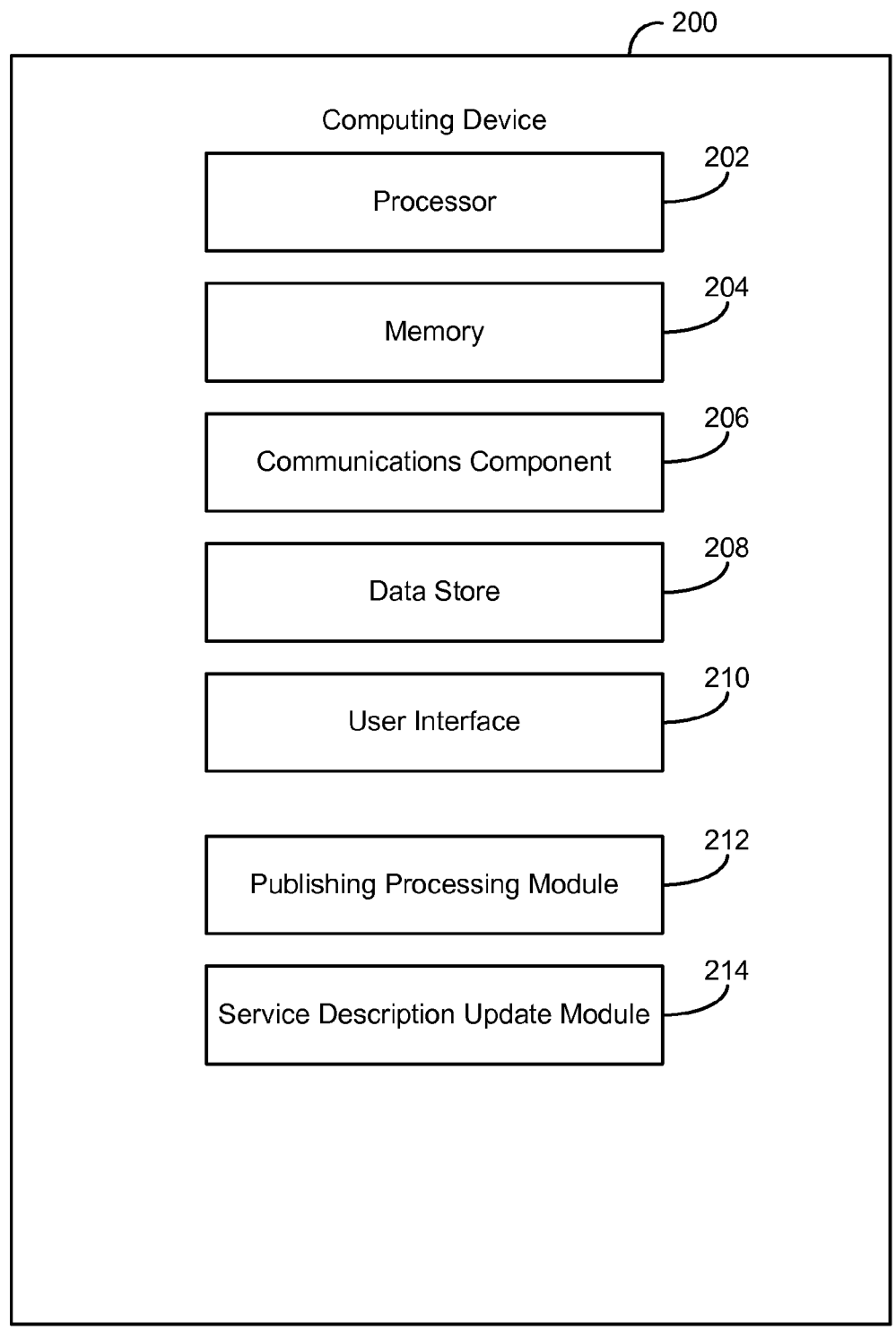
FIG. 2 is a schematic diagram of an aspect of a computing device configured to perform the functionality described herein in the network of FIG. 1.

FIG. 2 depicts an exemplary computing device 200 that may serve as a node in a peer-to-peer and/or overlay network. Computing device 200 includes a processor 202 for carrying out processing functions associated with one or more components and functions described herein. Processor 202 can include a single or multiple set of processors or multi-core processors. Moreover, processor 202 can be implemented as an integrated processing system and/or a distributed processing system.

Computing device 200 further includes a memory 204, such as for storing local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof.

Further, computing device 200 includes a communications component 206 that provides for establishing and maintaining communications with one or more parties utilizing hardware, software, and services as described herein. Communications component 206 may carry communications between components on computer device 200, as well as between computing device 200 and external devices, such as devices located across a communications network and/or devices serially or locally connected to computing device 200. For example, communications component 206 may include one or more buses, and may further include transmit chain components and receive chain components associated with a transmitter and receiver, respectively, operable for interfacing with external devices. Further, for example, communications component 206 may be configured to enable computing device 200 to communicate with other nodes in an overlay network.

Additionally, computing device 200 may further include a data store 208, which can be any suitable combination of hardware and/or software, that provides for mass storage of information, databases, and programs employed in connection with aspects described herein. For example, data store 208 may be a data repository for applications not currently being executed by processor 202.

Computing device 200 may additionally include a user interface component 210 operable to receive inputs from a user of computing device 200, and further operable to generate outputs for presentation to the user. User interface component 210 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 210 may include one or more output devices, including but not limited to a display, a speaker, a haptic feedback mechanism, a printer, any other mechanism capable of presenting an output to a user, or any combination thereof.

Computing device 200 may also include a publishing processing module 212 that facilitates publishing searchable service descriptions. In addition, computing device 200 may include a service description update module 214 that facilitates adding and updating documents in a distributed network. The service description update module 214 may be configured to cause the computing device to extract keywords from a received document, and to generate an update message for each keyword. The service description update module 214 may be further configured to determine which nodes are to receive each keyword, to generate a composite keyword update message comprising all of the individual update messages concatenated together, and to forward the message to a first node. In addition, service description update module 214 may be further configured to cause the computing device to, upon receipt of a composite update message from another node in the network, extract those keywords relevant to the node and to select a subsequent node to which the message should be forwarded, and to forward the message to the selected subsequent node.

Figure 3:
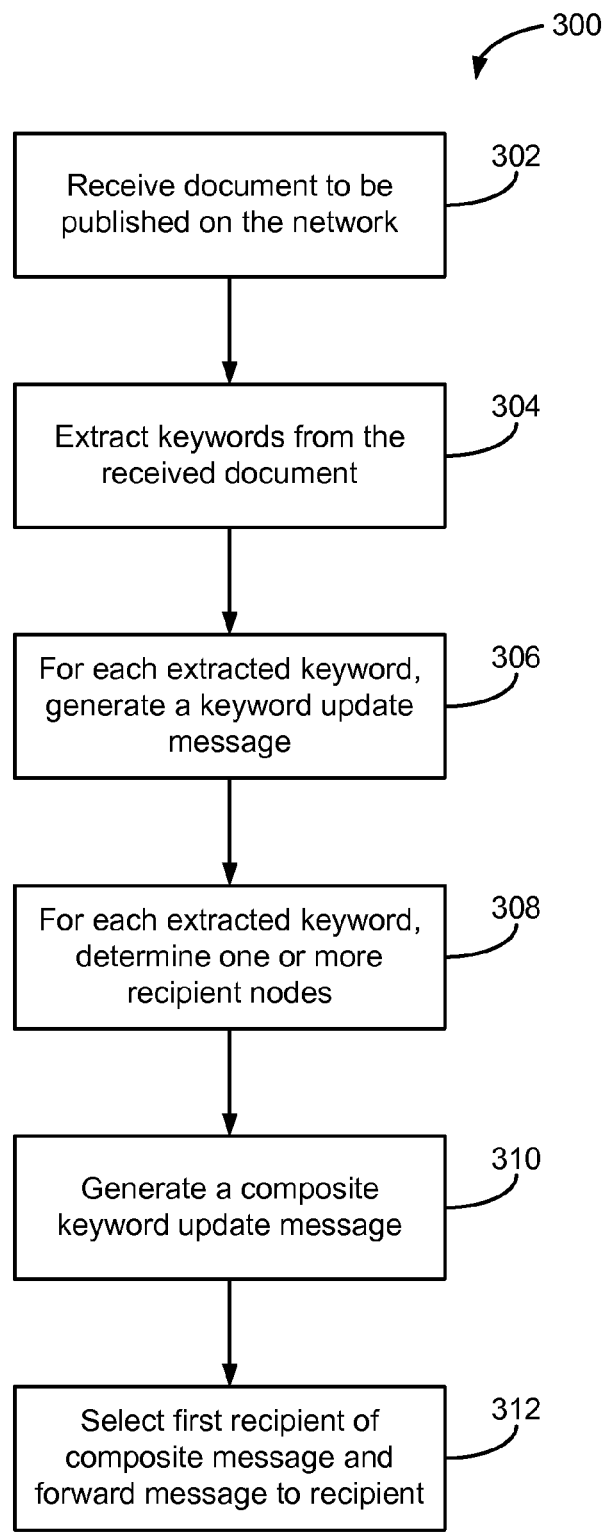
FIG. 3 is a flowchart of an aspect of a method of updating index information in an overlay network.

FIG. 3 is a flowchart depicting a process 300 that may be performed by a source node receiving a new or updated document for publishing on the network. As depicted at 302, a source node may receive a document to be published to the distributed network. The document may be a new document, or a document that has been revised. The source node extracts one or more keywords from the documents, as depicted at 304, and for each keyword, generates a keyword update message, as depicted at 306. The keywords may be extracted, for example, as simple keywords, as XML attribute-value pairs, as RDF triplets, and/or otherwise extracted. Generating keyword update messages may include generating PUT commands identifying the keyword and the particular service description to which the keyword belongs.

As depicted at 308, for each keyword, the source node may determine one or more recipient nodes for receiving the keyword. For example, the source node may perform a hash function on each keyword to determine its recipients. The hash function may be based on the underlying overlay network, such as Chord, Pastry, CAN, etc. The hash function maps the keyword to a node in a network that owns the keyword. As such, the source node can determine the recipients of the update message based on the keywords. The source node may then construct a composite update message by concatenating each of the individual keyword update messages into a single message, as depicted at 310. The composite update message may be in the form of a composite PUT message. As depicted at 312, the source node may select a first recipient of the composite update message, and may forward the message to the first recipient. Selection of the first recipient may be based on a predetermined factor, such as a node closest in distance, a node having a direct connection, a node having a closest identifier space. In the case where the distributed network comprises a circular identifier space, each node has a relative routing position to the overlay network based on its node identifier, e.g., an IP address or other identifier. For example, if the node has an IP address of 1234, then it finds the closest IP address, for example, moving clockwise around the circular identifier space, for the next higher or lower IP address of an adjacent node in the network.

Figure 4:
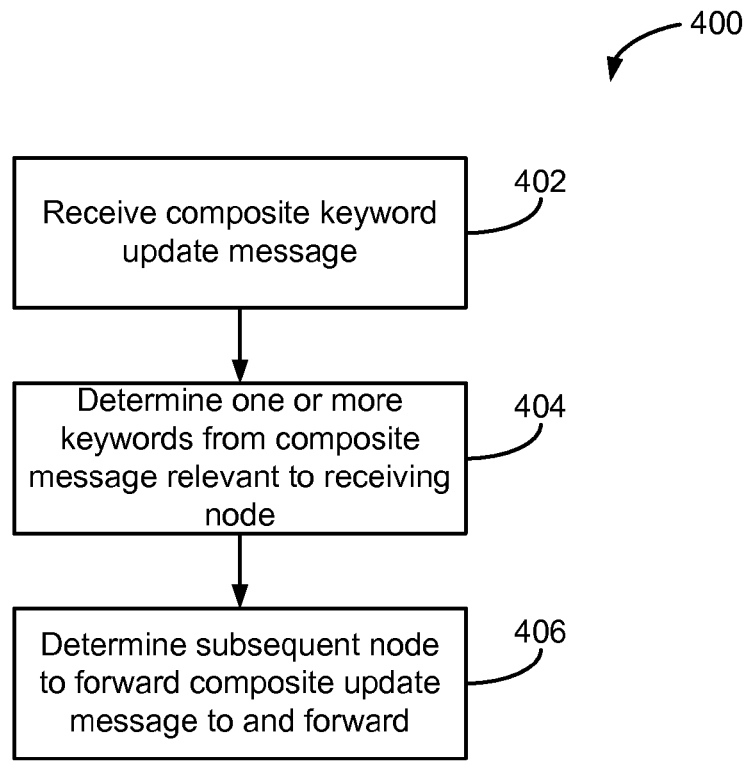
FIG. 4 is a flowchart of an aspect of a method of processing a service update message.

FIG. 4 is a flowchart depicting an exemplary method 400 of processing a received composite update message. The method 400 may be performed, for example, by the first and any subsequent recipients of a composite update message, as described with respect to FIG. 3. As depicted at 402, the recipient node receives the composite message. The recipient node may determine which one or more keywords in the composite update message are relevant to it, as depicted at 404. That is, the recipient node may determine which one or more keywords should be extracted and updated. For example, the recipient node may look at an identifier associated with the particular keyword, and may determine whether the identifier falls with the identifier space of the recipient node. If so, the keyword is extracted. Otherwise, it can be ignored.

As depicted at 406, the recipient node may determine a subsequent node to which the composite update message may be forwarded, and may forward the message to the particular node. The recipient node may be configured to compute the next node based on the same algorithm used by the first recipient node (FIG. 3) to determine the node to which the message should be forwarded, or may apply a different algorithm. Each recipient node, after extracting relevant keyword information, determines which node to next forward the composite update message to, and forwards the message along. In some aspects, when a receiving node is the only or the last node for which a particular keyword is relevant, the receiving node may remove the keyword update message for that keyword from the composite update message prior to forwarding it to the next node.

Figure 5:
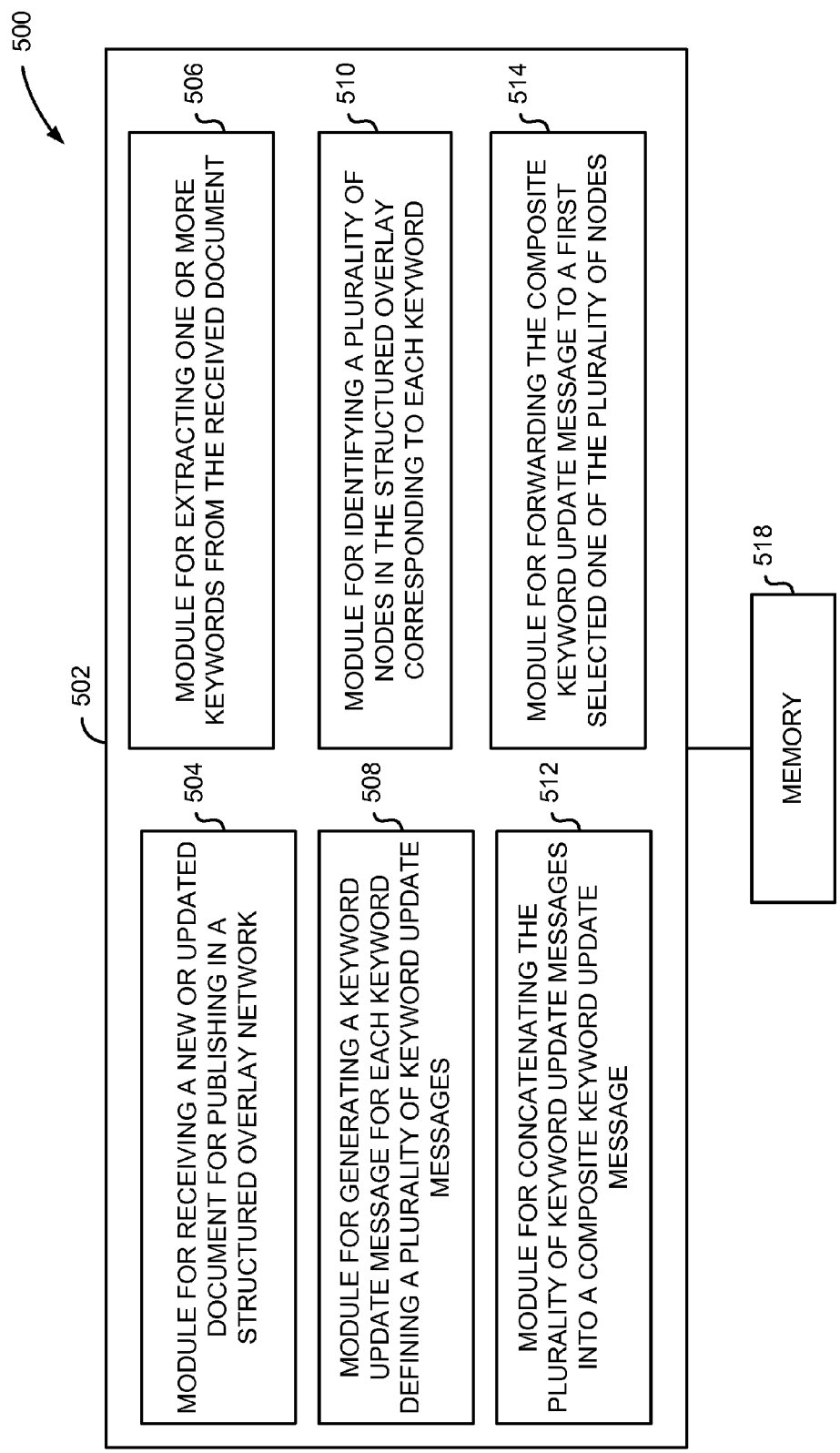
FIG. 5 is a schematic diagram of an aspect of a system for updating index information in a structured overlay network.

Turning to FIG. 5, illustrated is a system 500 for adding and updating keywords for an updated service description. As depicted, system 500 includes functional blocks that can represent functions implemented by a processor, software, or combination thereof (e.g., firmware). System 500 includes a logical grouping 502 of electrical components that act in conjunction. System 500 may be implemented, for example, by a computing device acting as a node in a distributed network.

Logical grouping 502 can include a module for receiving a new or updated document for publishing in a structured overlay network 504. Moreover, logical grouping 502 can include a module for extracting a plurality of keywords from the document 506. Logical grouping 502 may further include a module for generating an update message for each keyword defining a plurality of keyword update message 508; a module for identifying a plurality of nodes in the structured overlay network corresponding to each keyword 510; a module for concatenating the plurality of keyword update messages into a composite keyword update message 512; and a module for forwarding the first keyword update message to a first selected one of the plurality of nodes 514. Additionally, system 500 can include a memory 518 that retains instructions for executing functions associated with electrical components 504-514. While shown as being external to memory 518, it is to be understood that electrical components 504-514 can exist within memory 518.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of updating index information in a distributed network, comprising:
   receiving, at a source node, a new or updated document for publishing in a structured overlay network;
   extracting a plurality of keywords from the document;
   generating a keyword update message for each of the plurality of keywords extracted from the document to define a plurality of keyword update messages;
   identifying, for each of the plurality of keywords extracted from the document, one or more nodes of a plurality of nodes in the structured overlay network for receiving each of the plurality of keywords;
   concatenating a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;

forwarding the first composite keyword update message to the first selected one of the plurality of nodes in the structured overlay network; and forwarding the second composite update message to the second selected one of the plurality of nodes in the structured overlay network, the forwarding of the first composite update message and the second composite update message occuring substantially in parallel.

2. The method of claim 1, wherein the first selected one of the plurality of nodes is configured for:

receiving the first composite keyword update message;

extracting a first keyword update message of the first portion of the plurality of keyword update messages corresponding to a keyword stored by the first selected one of the plurality of nodes;

performing updates according to the first keyword update message; and forwarding the first composite keyword update message to a third selected one of the plurality of nodes.

3. The method of claim 1, further comprising selecting one of the plurality of nodes having a direct connection to the source node as the first selected one of the plurality of nodes.

4. The method of claim 1, further comprising selecting one of the plurality of nodes having a closest identifier space to the source node as the first selected one of the plurality of nodes.

5. The method of claim 2, wherein the first selected one of the plurality of nodes is further configured for:

determining that at least one keyword update message from the first composite keyword update message is directed only to the first selected one of the plurality of nodes; and removing the at least one keyword update message from the first composite keyword update message prior to forwarding the first composite update message to the third selected one of the plurality of nodes.

6. The method of claim 1, wherein the first portion plurality of keyword update messages are concatenated into the first composite update message in order of distance to the source node.

7. A least one processor configured to publish or discover services in a network, comprising:

a first module for receiving a new or updated document for publishing in a structured overlay network;

a second module for extracting a plurality of keywords from the document;

a third module for generating a keyword update message for each of the plurality of keywords extracted from the document to define a plurality of keyword update messages;

a fourth module for identifying, for each of the plurality of keywords extracted from the document, one or more nodes of a plurality of nodes in the structured overlay network for receiving each of the plurality of keywords;

a fifth module for concatenating a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;

a sixth module for forwarding the first composite keyword update message to the first selected one of the plurality of nodes in the structured overlay network; and a seventh module for forwarding the second composite keyword update message to the second selected one of the plurality of nodes in the structured overlay network, the forwarding of the first composite keyword update message and the second composite keyword update message occurring substantially in parallel.

8. A computer program product, comprising: a non-transitory computer-readable medium comprising:

a first set of codes for causing a computer to receive a new or updated document for publishing in a structured overlay network;

a second set of codes for causing the computer to extract a plurality of keywords from the document;

a third set of codes for causing the computer to generate a keyword update message for each of the plurality of keywords extracted from the document to define a plurality of keyword update messages;

a fourth set of codes for causing the computer to identify, for each of the plurality of keywords extracted from the document, one or more nodes of a plurality of nodes in the structured overlay network for receiving each of the plurality of keywords;

a fifth set of codes for causing the computer to concatenate a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;

a fifth set of codes for causing the computer to forward the first composite keyword update message to the first selected one of the plurality of nodes in the structured overlay network; and a sixth set of codes for causing the computer to forward the second composite keyword update message to the second selected one of the plurality of nodes in the structured overlay network, the forwarding of the first composite keyword update message and the second composite keyword update message occurring substantially in parallel.

9. An apparatus, comprising:

means for receiving a new or updated document for publishing in a structured overlay network;

means for extracting a plurality of keywords from the document;

means for generating a keyword update message for each of the plurality of keywords extracted from the document to define a plurality of keyword update messages;

means for identifying, for each of the plurality of keywords extracted from the document, one or more nodes of a plurality of nodes in the structured overlay network for receiving each of the plurality of keywords;

means for concatenating a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;

means for forwarding the first composite keyword update message to the first selected one of the plurality of nodes in the structured overlay network; and means for forwarding the second composite keyword update message to the second selected one of the plurality of nodes in the structured overlay network, the forwarding of the first composite keyword update message and the second composite keyword update message occurring substantially in parallel.

10. An apparatus for updating index information in a distributed network, comprising:

a receiver configured to receive a new or updated document for publishing in a structured overlay network;

a service description update component configured to extract a plurality of keywords from the document, generate a keyword update message for each of the plurality of keywords extracted from the document to define a plurality of keyword update messages, identify, for each of the plurality of keywords extracted from the document, one or more nodes of a plurality of nodes in the structured overlay network for receiving each of the plurality of keywords, concatenate a first portion of the plurality of keyword update messages into a first composite keyword update message and a second portion of the plurality of keyword update messages into a second composite keyword update message, forward the first composite keyword update message to a first selected one of the plurality of nodes in the structured overlay network, and forward the second composite keyword update message to a second selected one of the plurality of nodes in the structured overlay network, the forwarding of the first composite keyword update message and the second composite keyword update message occurring substantially in parallel, wherein the first composite keyword update message comprises a first one of the plurality of keyword update messages corresponding to a keyword stored by the first selected one of the plurality of nodes and the second one of the plurality of keyword update messages corresponding to a keyword stored by the second selected one of the plurality of nodes.

11. The apparatus of claim 10, wherein the service description update component is further configured to select one of the plurality of nodes having a direct connection to the source node as the first selected node of the plurality of nodes.

12. The apparatus of claim 10, wherein the service description update component is further configured to select one of the plurality of nodes having a closest identifier space to the source node as the first selected one of the plurality of nodes.

13. The apparatus of claim 10, wherein the service description update component is further configured to concatenate the first plurality of keyword update messages into the first composite update message in order of distance to the source node.

14. An apparatus for processing service description update messages in a distributed network, comprising:

a receiver configured to receive at a source node, a new or updated document for publishing in the distributed network;

an extractor configured to extract a plurality of keywords from the document;

a keyword update message generator configured to generate a keyword update message for each of the plurality of keyword extracted from the document to define a plurality of keyword update messages;

an identifier configured to identify, for each of the plurality of keywords extracted from the document, one or more nodes of a plurality of nodes in the distributed network for receiving each of the plurality of keywords;

a concatenating unit configured to concatenate a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;

a service description update component configured to extract, by the receiving node, the first one of the plurality of keyword update messages from the first composite keyword update message corresponding to the keyword stored by the receiving node, perform updates according to the extracted first keyword update message, forward the first composite keyword message to the receiving node in a distributed network and forward the second composite keyword message to the second selected one of the plurality of nodes in the distributed network, the forwarding of the first composite keyword update message and the second composite keyword update message occurring substantially in parallel.

15. The apparatus of claim 14, the service description update component is further configured to select one of the plurality of nodes having a direct connection as the second selected one of the plurality of nodes.

16. The apparatus of claim 14, wherein the service description update component is further configured to select one of the plurality of nodes having a closest identifier space as the second selected one of the plurality of nodes.

17. A method for processing service description update messages in a distributed network, comprising:

receiving at a source node, a new or updated document for publishing in the distributed network;

extracting a plurality of keywords from the document;

generating a keyword update message for each of the plurality of keyword extracted from the document to define a plurality of keyword update messages;

identifying, for each of the plurality of keywords extracted from the document, one or more nodes of a plurality of nodes in the distributed network for receiving each of the plurality of keywords;

concatenating a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;

extracting, by the receiving node, the first one of the plurality of keyword update messages from the first composite keyword update message corresponding to the keyword stored by the receiving node;

performing updates one or more documents according to the extracted first keyword update message;

forwarding the first composite keyword message to the receiving node in a distributed network and forwarding the second composite keyword message to the second selected one of the plurality of nodes in the distributed network, the forwarding of the first composite keyword update message and the second composite keyword update message occurring substantially in parallel.

18. The method of claim 17, further comprising:
selecting one of the plurality of nodes having a direct connection as the second selected one of the plurality of nodes.

19. The method of claim 17, further comprising:
selecting one of the plurality of nodes having a closest identifier space as the second selected one of the plurality of nodes.

20. At least one processor configured processing service description update messages in a distributed network, comprising:
a first module for receiving at a source node, a new or updated document for publishing in the distributed network;
a second module for extracting a plurality of keywords from the document;
a third module for generating a keyword update message for each of the plurality of keyword extracted from the document to define a plurality of keyword update messages;
a fourth module for identifying, for each of the plurality of keywords extracted from the document, one or more nodes of a plurality of nodes in the distributed network for receiving each of the plurality of keywords;
a fifth module for concatenating a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;
a sixth module for extracting, by the receiving node, the first one of the plurality of keyword update messages from the first composite keyword update message corresponding to the keyword stored by the receiving node, performing updates one or more documents according to the extracted first keyword update message;
a seventh module for forwarding the first composite keyword message to the receiving node in a distributed network and forwarding the second composite keyword message to the second selected one of the plurality of nodes in the distributed network, the forwarding of the first composite keyword update message and the second composite keyword update message occurring substantially in parallel.

21. A computer program product, comprising:
a non-transitory computer-readable medium comprising;
a first set of codes for causing a computer to receive, at a source node, a new or updated document for publishing in the distributed network;
a second set of codes for causing the computer to extract a plurality of keywords from the document;
a third set of codes for causing the computer to generate a keyword update message for each of the plurality of keyword extracted from the document to define a plurality of keyword update messages;
a fourth set of codes for causing the computer to identify, for each of the plurality of keywords extracted from the document, one or more nodes of a plurality of nodes in the distributed network for receiving each of the plurality of keywords;
a fifth set of codes for causing the computer to concatenate a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;
a sixth set of codes for causing the computer to extract, by the receiving node, the first one of the plurality of keyword update messages from the first composite keyword update message corresponding to the keyword stored by the receiving node, performing updates one or more documents according to the extracted first keyword update message;
a sixth set of codes for causing the computer to forward the first composite keyword message to the receiving node in a distributed network and to forward the second composite keyword message to the second selected one of the plurality of nodes in the distributed network, the forwarding of the first composite keyword update message and the second composite keyword update message occurring substantially in parallel.

22. An apparatus, comprising:
means for receiving, at a source node, a new or updated document for publishing in the distributed network;
means for extracting a plurality of keywords from the document;
means for generating a keyword update message for each of the plurality of keyword extracted from the document to define a plurality of keyword update messages;
means for identifying, for each of the plurality of keywords extracted from the document, one or more nodes of a plurality of nodes in the distributed network for receiving each of the plurality of keywords;
means for concatenating a first portion of the plurality of keyword update messages into a first composite keyword update message and a second portion of the plurality of keyword update messages into a second composite keyword update message, wherein the first composite keyword update message comprises a first one of the plurality of keyword update messages corresponding to a keyword stored by a first selected one of the plurality of nodes and the second one of the plurality of keyword update messages corresponding to a keyword stored by a second selected one of the plurality of nodes;
means for extracting, by the receiving node, the first one of the plurality of keyword update messages from the first composite keyword update message corresponding to the keyword stored by the receiving node, performing updates one or more documents according to the extracted first keyword update message;
means for forwarding the first composite keyword message to the receiving node in a distributed network and forwarding the second composite keyword message to the second selected one of the plurality of nodes in the distributed network, the forwarding of the first composite keyword update message and the second composite keyword update message occurring substantially in parallel.

23. The apparatus of claim 10, wherein the service description update component is further configured to generate the first composite keyword update message to allow the first selected one of the plurality of nodes to forward at least a portion of the first composite keyword update message to a third selected one of the plurality of nodes, wherein the at least the portion comprises a second keyword update message corresponding to a keyword stored by the third selected one of the plurality of nodes.

* * * * *